United States Patent [19]

Domig et al.

[11] 4,027,232
[45] May 31, 1977

[54] DEVICE FOR MONITORING THE TRAVEL OF A YARN LIKE STRUCTURE UTILIZING THE FRICTIONAL ELECTRICITY INVOLVED WITH SAID TRAVEL

[75] Inventors: Rene Domig, Kusnacht; Erich Weidmann, Kleinandelfingen, both of Switzerland

[73] Assignee: Aktiengesellschaft Gebrüder Loepfe, Wetzikon, Switzerland

[22] Filed: Nov. 14, 1975

[21] Appl. No.: 632,104

[30] Foreign Application Priority Data

Nov. 29, 1974 Switzerland ................. 15854/74

[52] U.S. Cl. ................................ 324/32; 28/64; 73/160
[51] Int. Cl.² ............... G01R 29/12; G01N 27/60; D01H 13/22
[58] Field of Search .............. 324/32, 54, 72; 73/95.5, 160; 28/64

[56] References Cited

UNITED STATES PATENTS 3,037,162   5/1962   Jones et al. ................ 324/54
3,676,769   7/1972   Loepfe ........................ 324/32

FOREIGN PATENTS OR APPLICATIONS 906,237   9/1962   United Kingdom ............. 324/32

*Primary Examiner*—Gerard R. Strecker
*Attorney, Agent, or Firm*—Werner W. Kleeman

[57] ABSTRACT

The present invention relates to monitoring devices of the type making use of the principle that frictional contact between two bodies gives rise to electrical charges or voltages on the bodies. The monitoring device of the invention comprises yarn guiding means, at least one signal electrode and at least one ground electrode. Means are provided for generating yarn travel signals exhibiting improved continuity and a high signal-to-noise ratio.

8 Claims, 13 Drawing Figures

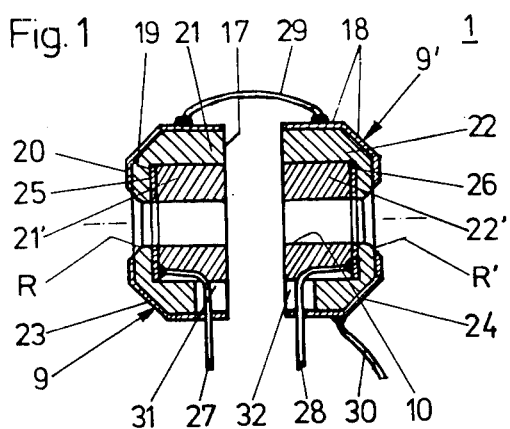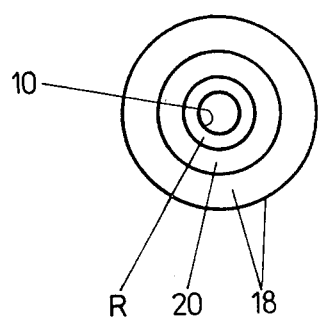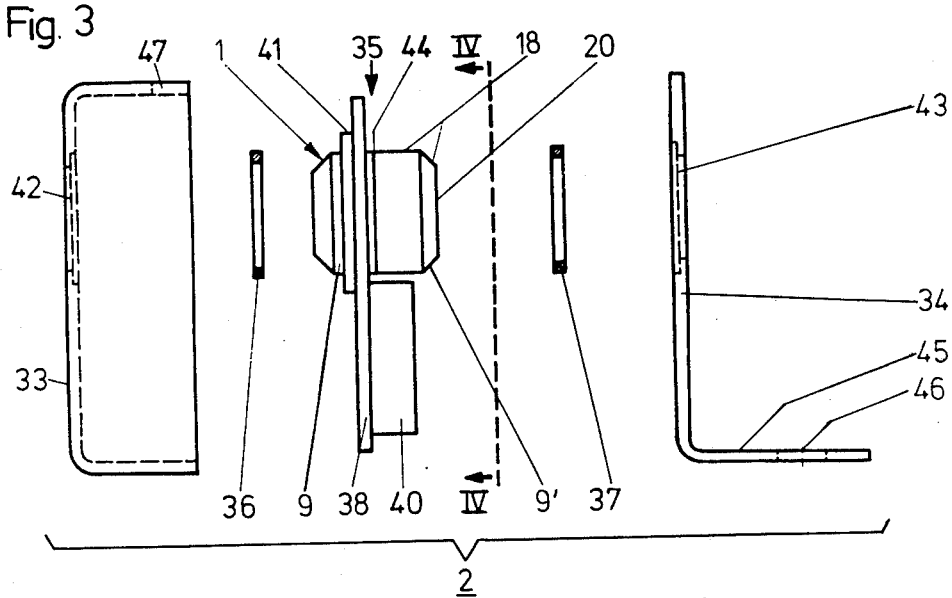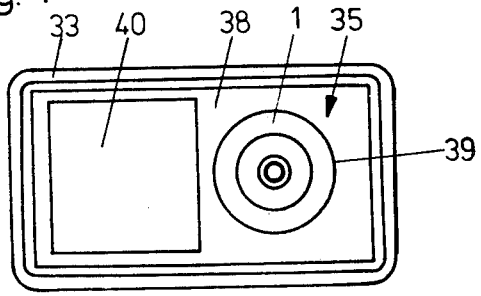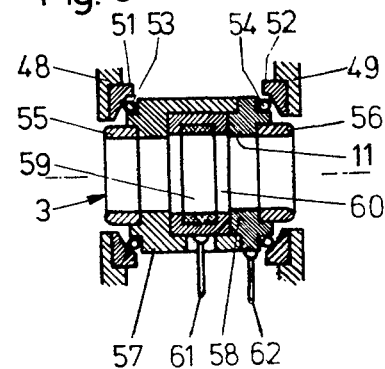

DEVICE FOR MONITORING THE TRAVEL OF A YARN LIKE STRUCTURE UTILIZING THE FRICTIONAL ELECTRICITY INVOLVED WITH SAID TRAVEL

BACKGROUND OF THE INVENTION

The present invention relates to a new and improved device for monitoring the travel of thread-like objects, such as yarns, threads, wires or endless webs, e.g. in textile machines of various kinds.

Monitoring or sensing devices of the type using electromagnetic or piezoelectric transducers having a feeler member in frictional contact with a travelling yarn are well known in the art. Those known sensing devices may generate yarn travel signals of high amplitude; however, they are also responsive to shocks, mechanical vibrations, ambient noise and other trouble generally present and unavoidable in texitile plants. Other sensing devices or units for determining a relative movement between two bodies, e.g. a yarn and an insulated friction body, are described in U.S. Pat. No. 3,676.769. These sensing units make use of electrical charges or voltages which are generated or induced in the unit by the travelling yarn, and thus they are hardly susceptible to shock, mechanical vibration and noise. The monitoring devices of the present invention constitute improvements of those disclosed in the aforementioned U.S. Pat. No. 3,676,769.

All of the mentioned known sensing or monitoring devices produce yarn travel signals in the shape of A.C.-waveforms. However, it frequently happens that the yarn travel signal is not really continuous and exhibits short interruptions even when the yarn is travelling. One cause of such interruptions may be transversal movements or vibrations of the yarn giving rise to changes in the friction between the yarn and the member of the sensing device which is in frictional contact with the yarn. Such interruptions simulate yarn breakages and may cause the textile machine to stop. It is evident that such unwanted machine downtimes must be avoided, since only a real yarn breakage has to stop the machine.

SUMMARY OF THE INVENTION

It is a primary object of the present invention to provide further developments and improvements upon the monitoring or sensing devices described in U.S. Pat. No. 3,676,769, said sensing devices comprising yarn guiding means, at least one ground electrode and at least one signal electrode electrically insulated from the at least one ground electrode.

It is a more specific objective of the present invention to take measures for avoiding undesired interruptions of the yarn travel signal, generating such signals having a high amplitude or signal level, and an improved rate of high frequency signal components.

Another objective of the present invention is the provision of monitoring or sensing devices which provide for an improved signal-to-noise ratio in the yarn travel A.C. signal.

Now in order to implement the aforementioned objectives and others which will become more readily apparent as the description proceeds, the monitoring device of the invention is characterized in that yarn guiding means and signal and ground electrodes are arranged to form a yarn passageway, and at least one signal electrode is formed with an interior surface exposed for frictional contact with a yarn-like object travelling through said passageway in frictional contact with the yarn guiding means.

BRIEF DESCRIPTION OF THE DRAWINGS

The invention will be better understood and objects other than those set forth above will become apparent upon consideration of the following detailed description thereof which refers to the annexed drawings wherein:

FIGS. 1 and 2 are a longitudinal section and an end view, respectively, of a first embodiment of the inventive monitoring or sensing unit;

FIG. 3 is a partially exploded view of a monitoring head comprising a similar monitoring unit as shown in FIGS. 1 and 2, a preamplifier, a casing, and further details;

FIG. 4 shows the monitoring head represented in FIG. 3 as viewed from the line IV—IV in FIG. 3;

FIG. 5 is a longitudinal section of a second embodiment of an inventive monitoring or sensing unit disposed in a casing;

DETAILED DESCRIPTION OF THE INVENTION

Figure 6:
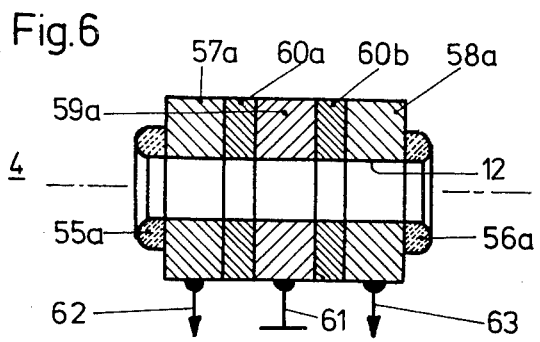
FIGS. 6 and 7 represent a third embodiment of a monitoring or sensing unit in schematic longitudinal section and end view.

With reference to FIGS. 1 and 2, the therein illustrated exemplary embodiment of monitoring device or sensing unit 1 is composed of two substantially identical hollow structures 9,9' which are shown in FIG. 1, for the sake of clearness, with a distance therebetween. Hollow structures 9,9' have cylindrical bores forming a passageway 10 for a travelling yarn (not shown). The details of such structures will now be explained with reference to hollow structure 9.

This hollow structure is substantially ring-shaped and comprises a yarn guiding or guide body 21 made of ceramic material, an outer or ground electrode 23, an inner or signal electrode 25 and an inner filling body 21' which may consist of the same material as yarn guiding body 21, or of cast resin.

Ground electrode 23 covers the outer surfaces 18 of yarn guiding body 21 including the ring-shaped outer end face 20 thereof. Yarn guiding body 21 has an inner ring-shaped electrode face 19 for receiving the ring-shaped signal electrode 25. Faces 19 and 20, and thus the ring-shaped electrode 25 and the ring-shaped portion of ground electrode 23 on the outer end face 20 are in substantially parallel relationship. Signal electrode 25 is connected to a signal conductor 27. A slot 31 is provided in yarn guiding body 21 for receiving signal conductor 27. Yarn guiding body 21 has a flat inner end face 17 for being connected, e.g. by cementing, to the opposite inner end face of hollow structure 9'.

A lead wire 29 connects ground electrodes 23, 24 of hollow structures 9,9', and a ground conductor 30 is connected to one of the ground electrodes such as here shown ground electrode 24. The outer ends of hollow structures 9,9' are bevelled or rounded. Particularly, bevelled or rounded ends of passageway 10 form zones R,R' which are in frictional contact with a yarn when travelling through passageway 10.

After cementing the hollow structures 9,9' together, slots 31,32 may be filled with a casting material. Then, the outer electrodes 23, 24 form a vat-shaped cage which peripherally surrounds the signal electrodes 25, 26 with respect to yarn guide bodies 21,22, and which also covers the outer ring-shaped end faces 20. Thus, signal electrodes 25,26 are shielded in an extremely efficient manner from outer electrostatic and electromagnetic fields, when they are connected to ground through ground connector 30. Inner electrodes 25,26 serve for generating yarn travel signals and may be connected to signal amplifying and evaluating electronic circuitry, e.g. a circuit as shown in FIG. 1a of U.S. Pat. No. 3,676,769 and described therein, and the disclosure of which Patent is incorporated herein by reference.

It is to be noted that with the monitoring or sensing unit 1 as shown in FIG. 1, each of the hollow structures 9,9'per se might be used for monitoring a travelling yarn. However, the use of a unit composed of two such structures tends to deliver a more continous yarn continuous signal, particularly in the event that the travelling yarn undergoes transversal movement such as to intermittently loose the frictional contact with one of the friction contact zones R,R'. The monitoring or sensing unit 1 has two further characteristics which contribute to generating improved yarn travel signals and reducing the influence of noise and spurious signals. Firstly, the provision of the ground electrodes 23,24 in direct contact with the insulating yarn guiding bodies 21,22 causes the electrostatic charges which are generally produced by travelling yarns, particularly thick yarns and threads, to be partially drained off from said guiding bodies. Such charges, which often attain considerable values, are able to overload and render ineffective the electronic circuitry connected to monitoring or sensing unit 1. Secondly, it is advantageous that the inner or signal electrodes 25,26 extend, at their inner circumstances, close to the outer end faces 20 and the ring-shaped portions of ground electrodes 23,24 disposed thereon, and close to the friction zones R,R'. By virtue of this measure, there is provided a small distance between the signal and ground electrodes, and also between the signal electrodes and the friction zones R,R', which favours the generation of continuous yarn travel signals. Moreover, by the aforesaid measures, not only is there improved the amplitude of the yarn travel signals, but also the rate of high-frequency components which facilitates the evaluation of said signals and the suppression of low frequency noise and spurious or trouble signals.

FIG. 3 shows the components of a monitoring head 2 with a casing 33 in exploded view, schematic representation and on a smaller scale relative to FIG. 1. Casing 33 is formed as a substantially rectangular box or housing and provided with a lid or cover 34. Casing 33 receives a sensing insert 35 comprising, as main parts, a base plate 38, monitoring or sensing unit 1, a preamplifier 40 and a fastening ring 41 which serves for securing monitoring or sensing unit 1 to base plate 38, e.g. by cementing. Two washers 36,37 formed of elastic material, such as rubber, are provided which, in the assembled monitoring head 2, rest against stepped apertures or bores 42,43 of casing 33 and lid 34, respectively, on the one hand, and against monitoring or sensing unit 1, on the other hand, thus clamping sensing unit 1 between casing 33 and lid 34. The two hollow structures 9,9' are joined with each other, e.g. by cementing, at joint 44.

A bent off or angled extension of lid or cover 34 serves as bracket 45 which has a bore 46 in order to allow monitoring head 2 to be fastened to the frame of a textile machine by means of a screw (not shown) or any other suitable or equivalent fastening structure. For the sake of simplicity and clarity in illustration, the conductors connected to sensing unit 1 and preamplifier 40 which may be lead out of casing 33 through a recess 47, and the elements of any suitable construction for joining casing 33 with lid 34, such as screws, are not shown in FIG. 3. Sensing unit 1 is received in a circular aperture or opening 39 (FIG. 4) of base plate 38 and may be cemented with fastening ring 41 as mentioned above.

Lid 34 which also serves for mounting monitoring head 2 on a machine, preferably consists of metal in order to attain a high ruggedness or robustness. Casing 33 may be made of metal or synthetic material. In the event that an additional electrical shielding is required for sensing insert 35, casing 33 preferably consists of metal, or a synthetic material lined with an electrically conducting layer. The outer or ground electrodes 23,24 (FIG. 1) may be connected with such a casing 33 through ground conductor 30.

With reference to FIG. 4, the sensing insert 35 comprising base plate 38, monitoring unit 1 and preamplifier 40 is disposed in the open casing 33 which has a substantially rectangular shape. Of course, the casing may alternatively be shaped as a round capsule, in which case the components of a preamplifier may be arranged on a substantially ring-shaped base plate surrounding monitoring unit 1.

In FIG. 5, sensing unit 3 is clamped between two parallel walls 48,49 of a casing which is not further shown, by means of hard washers 51,52 and soft rubber washers 53,54. The casing consists of electrically conducting material, such as metal, for electrically shielding sensing unit 3. The latter comprises two ring-shaped yarn guiding elements 55,56 made of a material having a high superficial hardness, such as ceramic oxide, and further comprises two substantially ring-shaped stepped outer or signal electrodes 57,58 fitted into each other in axial direction.

A substantially ring-shaped inner electrode 59 serving as ground electrode is disposed coaxially to and within signal electrode 57, and electrically insulated therefrom by an insulating ring 60. The aforesaid yarn guiding elements 55,56 and electrodes 57,58,59 form a substantially cylindrical passageway 11. The internal diameter of ground electrode 59 may be the same as or somewhat larger than the internal diameter of signal electrodes 57,58 which is substantially equal or nearly equal to the internal diameter of the yarn guiding elements 55,56. A ground conductor 61 may connect the inner electrode 59 with the walls 48,49. With a practical embodiment, the axial dimension of sensing unit 3 is about 16 mm, and the radial thickness of insulating ring no more than 1 mm. When a yarn or thread travels through passageway 11 in frictional contact with the yarn guiding elements 55,56, the yarn is also in frictional contact with the internal surfaces of signal electrodes 57,58. A signal conductor 62 welded to one of the outer electrodes 58 supplies the yarn travel signals, generated when a yarn is travelling through passageway 11, to the input of an electronic circuitry (not shown).

With sensing unit 3, the two outer or signal electrodes 57,58 form the basic shape of sensing unit 3 and support the two yarn guiding elements 55,56 disposed with an axial spacing. Thus, the arrangement of the components in this sensing unit is principally different from that of sensing unit 1 shown in FIG. 1, where the yarn guide bodies define the basic shape of the sensing unit and support the electrodes.

With a modified mounting of sensing unit 3, the latter may be assembled on a base plate which carries the components of an electric circuit, e.g. a preamplifier, in a similar manner as illustrated with reference to FIGS. 3 and 4.

Figure 7:
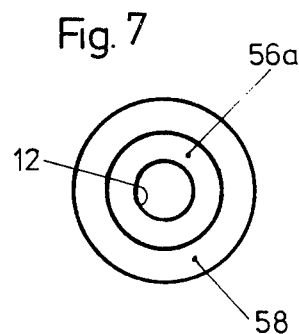

The sensing unit 4, FIGS. 6 and 7, comprises two substantially ring-shaped yarn guiding elements 55a,56a, two substantially ring-shaped outer or signal electrodes 57a,58a, a substantially ring-shaped inner or ground electrode 59a, and two thin insulating disks 60a,60b disposed between the inner electrode 59a and the two outer electrodes 57a, 58a.

This sensing unit 4 possesses an extraordinarily simple structure since the electrodes 57a,58a and 59a are of the same shape and dimensions or size, and this is also the case for the insulating disks 60a,60b and yarn guiding elements 55a,56a. Thus, this structure necessitates only three different types of components, namely ring-shaped guiding elements as the first type, ring-shaped electrodes as the second type, and thin insulating disks as the third type.

The aforementioned components may be assembled by cementing in order to form an integral substantially cylindrical hollow structure having a longitudinal passageway 12. A ground conductor 61 is connected to inner electrode 61, and signal conductors 62,63 are soldered to outer electrodes 57a,58a. Sensing unit 4 may be mounted in a monitoring head or shielded casing in similar manner as described with reference to FIGS. 3, 4 and 5.

Figure 8:
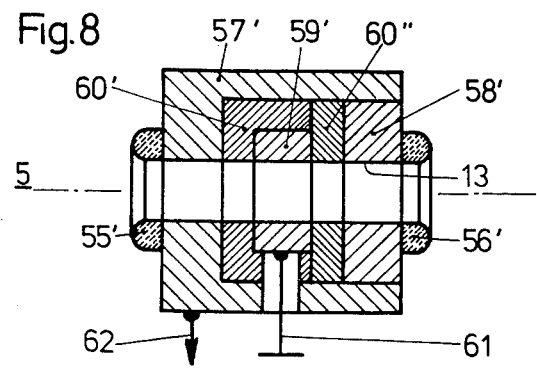
FIGS. 8 and 9 show a simplified embodiment of the monitoring device or unit illustrated with reference to FIG. 5.
Figure 9:
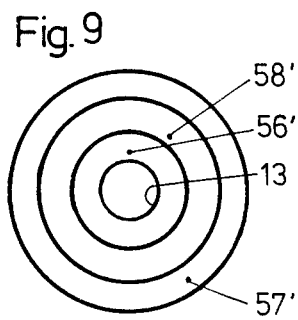

With reference to FIGS. 8 and 9, the sensing unit 5 is arranged in a manner somewhat similar to sensing unit 3, FIG. 5. There are provided two substantially ring-shaped yarn guiding elements 55',56', two outer or signal electrodes 57', 58' of substantially pot- and ring-shaped form, respectively, a substantially ring-shaped inner or ground electrode 59', and two substantially pot- and ring-shaped, respectively, insulating elements 60',60''. Inner or ground electrode 59' is connected with a ground conductor 61. Outer or signal electrodes 57',58' are fitted to each other by inserting substantially ring-shaped electrode 58' in the hollow space of pot-shaped electrode 57', so that these electrodes are electrically connected to each other. One of these electrodes 57' is provided with a signal conductor 62. With sensing unit 5, the substantially pot-shaped outer electrode 57' receives the remaining components 58',59',60' and 60'' in its interior hollow space. Guiding elements 55', 56' may be attached to the exposed end faces of outer electrodes 57', 58' by cementing or in other suitable manner. The thus assembled sensing unit 5 has a substantially cylindrical passageway 13 for receiving a thread or yarn to be sensed or monitored.

Sensing unit 5 may be disposed in a monitoring head as illustrated with reference to FIGS. 3 and 4. The axial dimension of the sensing units 4 and 5 may be, by way of example, 20 mm. The thickness of insulating disks 60a, 60b and 60', 60'' as measured between the ground and signal electrodes may be 1 mm or less, preferably 0.5 mm.

Modifying the structures shown in FIGS. 6 and 8, each of the outer electrodes 57a, 58a, 57', 58' together with the adjacent yarn guiding element may be replaced by an integral component. This is feasible since now electrically conducting materials having a high superficial hardness are available, e.g. metal carbides, such as tungsten carbide and titanium carbide. Thus, electrodes 57a, 58a, FIG. 6, may be designed to work as yarn guiding elements, by bevelling or rounding the exposed ends of yarn passageway 12 in a similar manner as shown with yarn guiding element 55a, FIG. 6. It is to be understood that generally the yarn guiding elements need not be made of insulating material, such as ceramic oxide.

The sensing units shown in FIGS. 5, 6 and 8 may be modified by using, in place of ground electrodes 59, 59a, 59', substantially ring-shaped ground electrodes whose interior surfaces are coated with an electrically insulating layer, e.g. formed of ceramic oxide. By such a measure, short-circuiting of the signal and ground electrodes is avoided, in particular when metal wires or threads having a high electrical conductivity are to be monitored.

The sensing or monitoring units described with reference to FIGS. 1 through 9 have the common essential feature that the signal electrodes are exposed, at their interior surfaces, for frictional contact with the yarn travelling through the passageway in direct frictional contact with said yarn guiding means. A further common characteristic consists in arranging the signal electrodes close by the ground electrodes so that a small distance exists between said electrodes at their interior surfaces forming the passageway for the travelling yarn. This small distance is defined, as in the embodiment shown in FIG. 6, by the thickness of the thin insulating disks 60a, 60b in the axial direction of passageway 12. As mentioned above with reference to FIG. 1, such a small distance between ground and signal electrodes favours the generation of continuous and strong yarn travel signals comprising an improved rate of high-frequency components.

The continuity of the yarn travel signals, i.e. an uninterrupted A.C. signal waveform, is of greatest importance when this signal is used for controlling the operation of a textile machine; e.g. the machine must be stopped when the yarn breaks and the A.C. yarn travel signal disappears. A great deal of high-frequency components in the yarn travel signal is advantageous, since mainly in the range of lower frequencies, e.g. up to 1 KHz, noise and spurious or trouble signals are existent which jeopardize the faultless operation of a yarn monitoring apparatus, such as, for instance, a filling or weft thread monitoring device on a weaving loom. Such noise and spurious or trouble signals may be neutralized by suppressing the low-frequency components by a high-pass filter device; however, this measure is practicable only if the yarn travel signal has a substantial content of high-frequency components.

Figure 10:
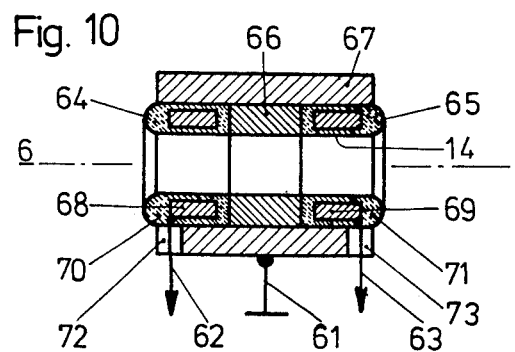
FIGS. 10, 11 and 12 are views of two further embodiments of the inventive monitoring device or unit comprising covered electrodes.
Figure 11:
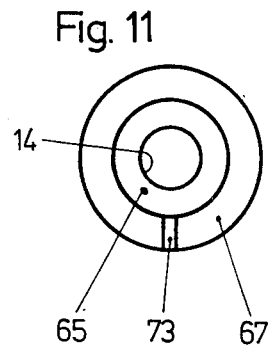

The monitoring or sensing unit 6 shown in FIGS. 10 and 11 comprises three electrodes, i.e. two covered signal electrodes 68 and 69 provided with insulating covers 70 and 71, respectively, a ground electrode 66, and a shielding electrode 67. These electrodes are substantially ring-shaped or hollow cylindrical, and the signal electrodes 68, 69 together with their insulating covers 70 and 71, which covers 70 and 71 define yarn guiding means 64 and 65 respectively, and inner ground electrode 66 form a hollow cylindrical configuration with a passageway 14 in their axial direction. The interior cylindrical surfaces of the insulating covers 70 and 71 of signal electrodes 68 and 69 as well as of inner ground electrode 66 are exposed to the travelling yarn. As alluded to above, the covered signal electrodes each comprise a substantially ring-shaped electrode or core 68 and 69 and an electrically insulating cover 70 and 71, respectively. The latter may consist of ceramic oxide and operate as yarn guiding means 64, 65. Connected to each of the metallic ring-shaped electrodes 68, 69 is a signal conductor 62, 63, respectively. The electrodes 66, 68 and 69 and the insulating covers 70 and 71 of electrodes 68 and 69 are received in the surrounding shielding electrode 67 which has two slots 72, 73 at its end faces for passing signal conductors 62, 63 to the metal core-like electrodes 68, 69, respectively. Surrounding or shielding electrode 67, by virtue of its direct contact with inner ground electrode 66, is electrically connected thereto, and provided with a ground conductor 61 such as to function as an electrical shield for the electrodes 68, 69 serving as signal electrodes.

Figure 12:
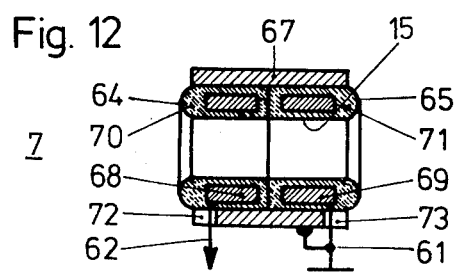

FIG. 12 shows a modified embodiment of the sensing unit described with reference to FIGS. 10 and 11. In sensing unit 7, inner ground electrode 66, FIG. 10, is omitted, and one of the covered electrodes 69 serves as ground electrode. The latter is electrically connected to ground conductor 61. There is provided a shielding electrode 67 of hollow substantially cylindrical shape which receives the covered electrodes 68, 69 which abut at their inner end faces of the insulating covers 70, 71 thereof. Shielding electrode 67 is also connected to ground conductor 61. In this sensing unit 7, the two covered electrodes 68, 69 together with their insulating covers or jackets 70, 71 form a passageway 15.

The sensing units 6 and 7 shown in FIGS. 10 and 12 have signal electrodes formed with electrically insulating surfaces. These sensing units are particularly designed for monitoring threads or wires exhibiting a substantial electrical conductivity sufficient to short-circuit electrodes which have electrically conducting surfaces, as used in the units described with reference to FIGS. 1, 5, 6 and 8.

Figure 13:
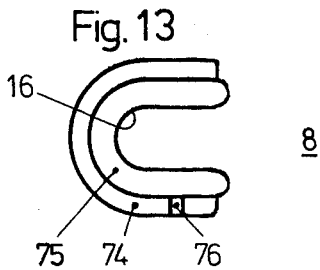
FIG. 13 is an end view of an embodiment having an open passageway.

Whereas the foregoing description refers to monitoring or sensing units having a transversal cross-sectional shape of rotational symmetry, FIG. 13 shows an end view of a sensing unit 8 having a U-shaped cross-section, thus forming an open passageway 16. A U-shaped shielding electrode 74 receives the other components which may be constructed in a similar manner as described with reference to the foregoing figures. For example, substantially U-shaped covered electrodes 75 may be provided having slots 76 for passing the signal and ground conductors. Such laterally open structures are advantageous when threading of a yarn in longitudinal or axial direction of the sensing unit is impractical, or when it is required that the yarn must be removed from the passageway in transversal direction and without cutting the yarn.

It is to be noted that the inventive sensing units may be designed for monitoring elongated or endless objects of any transversal or transverse cross-sectional shape, for instance such as threads, wires, tapes, webs and others, by formimg the sensing units with passageways of corresponding transversal cross section, as circular, rectangular, U-shaped and so forth.

The sensing units shown in the drawings and described in the foregoing specification have substantially symmetrical configuration with respect to a middle transversal plane, as the plane of joint 44 in FIG. 3. As results from the description of FIG. 1, such a symmetrical configuration is by no means necessary, it is, however, preferred when a sensing unit is desired which operates irrespective of the direction of yarn travel.

It is to be understood that the terms — hollow, hollow body, hollow cylindrical body, or equivalent expressions — as used in the present specification and claims refer to structures having a throughbore or passageway or passage. These structures may have the shape of a ring, hollow cylinder or a disk- or pot-shaped form.

The inventive monitoring units and heads may be used in thread or yarn travel supervising or monitoring appliances on textile machines, e.g. as weft monitors on weaving looms or thread monitors on knitting machines and automatic yarn winding machines.

The inventive sensing unit not only can be successfully used for monitoring the movement of textile threads in the widest sense including pre-spun threads, monofilaments and multifilaments, rather also can be used for metallic wires and heddle wires and thread-like structures formed of other materials, such as glass fiber strands, all by way of example. It is in this sense that the terms "thread" or "yarn" as used throughout this patent should be understood and such expression is employed with the broadest possible connotation.

While there are shown and described present preferred embodiments of the invention, it is to be distinctly understood that the invention is not limited thereto, but may be otherwise variously embodied and practiced within the scope of the following claims.

What is claimed is:

1. A device for monitoring the travel of a yarn-like structure by generating an electric yarn travel signal, comprising at least one yarn guiding body, at least one ground electrode and at least one signal electrode electrically insulated from said at least one ground electrode, said at least one signal electrode producing said electric yarn travel signal in response to electric charge displacements generated by the traveling yarn at the region of said signal electrode, the improvement comprising:

said at least one yarn guiding body, ground electrode and signal electrode are shaped as hollow structures having substantially cylindrical interior surfaces and arranged such that the cylindrical interior surfaces form a yarn passageway having open ends;

each yarn guiding body is arranged at one of the open ends of said passageway and has a yarn friction zone adjoining the one open end;

each signal electrode is arranged in direct contact with a yarn guiding body and adjacent to said friction zone for generating a yarn travel signal; and said ground electrode cooperating with said signal electrode to provide a given reference potential for said signal electrode.

2. The device as defined in claim 1, wherein said signal and ground electrodes are formed with electrically conducting interior surfaces.

3. The device as defined in claim 1, wherein at least one of the signal and ground electrodes is formed with an electrically insulating interior surface.

4. The device as defined in claim 1, wherein said at least one yarn guiding body and said ground and signal electrodes are shaped as hollow bodies possessing substantially rotational symmetry and arranged in substantially coaxial relationship along said passageway.

5. The device as defined in claim 1, wherein said at least one yarn guiding body and said ground and signal electrodes are shaped as hollow substantially cylindrical bodies possessing substantially rotationally symmetrical cross-sectional areas and are arranged in substantially coaxial relationship along said passageway.

6. The device as defined in claim 1, wherein said at least one guiding body is made of electrically insulating material, said electrodes comprising a hollow signal electrode and a hollow ground electrode, said yarn guiding body is arranged upstream of the signal electrode, the ground electrode is arranged downstream of the signal electrode, and electrically insulating spacing means provided between said electrodes.

7. The device as claimed in claim 1, comprising two hollow yarn guiding bodies, said electrodes comprising two hollow signal electrodes and a hollow ground electrode, electrically insulating spacing means, said yarn guiding bodies, signal electrodes and ground electrode are arranged in substantially coaxial relationship along said passageway, said ground electrode being disposed between the signal electrodes and spaced therefrom by said spacing means, and said yarn guiding bodies being arranged adjacent the signal electrodes opposite to said spacing means.

8. The device as claimed in claim 1, wherein at least one yarn guiding body is a hollow structure having an outer surface, two ring-shaped outer end faces and two ring-shaped inner faces near said outer end faces, said electrodes comprising two signal electrodes disposed on the inner faces and two ground electrodes, said two ground electrodes covering the outer surface of said hollow structure including the outer end faces.

* * * * *